United States Patent [19]

Inoue

[11] Patent Number: 5,751,277
[45] Date of Patent: May 12, 1998

[54] IMAGE INFORMATION CONTROL APPARATUS AND DISPLAY SYSTEM

[75] Inventor: Hiroshi Inoue, Yokohama, Japan

[73] Assignee: Canon Kabushiki Kaisha, Tokyo, Japan

[21] Appl. No.: 406,791

[22] Filed: Mar. 20, 1995

Related U.S. Application Data

[63] Continuation of Ser. No. 174,070, Dec. 28, 1993, abandoned, which is a continuation-in-part of Ser. No. 47,385, Apr. 16, 1993, abandoned, which is a continuation of Ser. No. 721,820, Jun. 26, 1991, abandoned.

[30] Foreign Application Priority Data

Jun. 27, 1990 [JP] Japan .................................. 2-171101

[51] Int. Cl.$^6$ ........................................................ G09G 5/04
[52] U.S. Cl. .......................... 345/200; 345/185; 345/190; 345/193; 395/515
[58] Field of Search ........................ 345/97, 98, 99, 345/100, 145, 157, 185, 189, 190, 192, 193, 200, 204; 395/508, 509, 515, 516

[56] References Cited

U.S. PATENT DOCUMENTS 5,068,651  11/1991  Takebe et al. ............................ 345/200
5,097,256  3/1992  Eldridge et al. ......................... 345/145
5,196,837  3/1993  Shoji et al. ............................... 345/145

Primary Examiner—Richard Hjerpe
Assistant Examiner—Lun-Yi Lao
Attorney, Agent, or Firm—Fitzpatrick, Cella, Harper & Scinto

[57] ABSTRACT

An image information control apparatus includes a first system for recognizing scanning of a position of image information, and a first memory unit for, when the first system recognizes scanning of the position of image information, detecting and storing an address accessed to an image information storage with, the access being started by the recognition in units of lines in a scanning direction. In addition, a second memory unit stores a line address detected and stored for the first time, a second system compares contents of the first system for recognizing scanning of the position of image information with contents of the second memory unit, and a third system interrupts the function of the first system on the basis of the comparison result of the second system. A fourth system interrupts the function of the first system when drawing processing, control of which is started by scanning the position of image information, is ended.

18 Claims, 15 Drawing Sheets

CONSTANT PERIOD FONT PLOTTING ROUTINE FOR CRT

DPYINT FONT PLOTTING ROUTINE FOR CRT

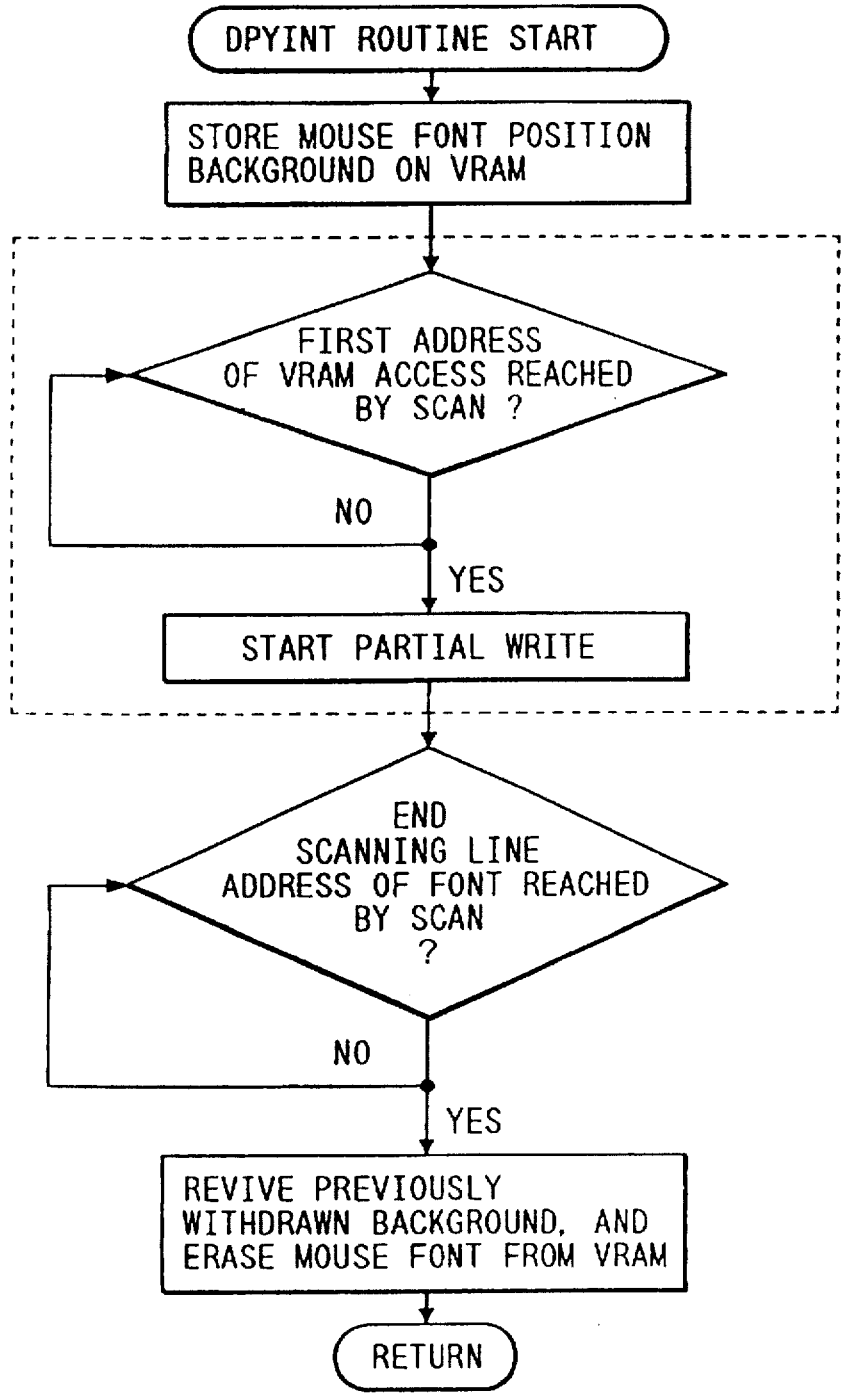

EFFECT OF DPYINT SYSTEM

1

IMAGE INFORMATION CONTROL APPARATUS AND DISPLAY SYSTEM

This application is a continuation of application Ser. No. 08/174,070 filed Dec. 28, 1993, now abandoned, which is a continuation-in-part of application Ser. No. 08/047,385 filed Apr. 16, 1993, abandoned, which is a continuation of application Ser. No. 07/721,820 filed Jun. 26, 1991, abandoned.

BACKGROUND OF THE INVENTION

1. Field of the Invention

The present invention relates to a display system and, more particularly, to an image information control apparatus for use in a display system using a ferroelectric liquid crystal having a memory function.

2. Related Background Art

The screen size and the resolution of a liquid crystal display system required in a personal computer (PC) or a workstation (WS) have been increased year by year, and the system is required to have compatibility with a conventional PC or WS.

A high-resolution graphic display "GSP34010 (tradename)" available from Texas Instruments which is a graphic processor widely used for general purposes provides a high-resolution graphic environment such as a Microsoft Windows (MS/Windows), a Presentation Manager (OS/2 available from Microsoft Corporation), or an X-Windows (a public domain licensed by Massachusetts Institute of Technology for use under a Unix environment) to users via GSP graphic software such as "DGIS (tradename)" available from Graphics Software System or "TIGA (tradename)" available from Texas Instruments.

Such GSP graphic software basically accesses a common VRAM (image information storage memory) because hardware of a GAP is commonly used. This function of hardware is a typical example of access to a VRAM of a one-frame buffer type. Therefore, VRAM access programming about mouse font display to be described below is a common method for the above-mentioned software and a typical example of a mouse font display method in VRAM access of a one-frame buffer type.

However, each of the above methods is invented for a display such as a CRT which is non-interlace-driven at a predetermined period, another means is further required for a device such as an FLCD (ferroelectric liquid crystal device) having a memory effect using both full-screen refresh multi-interlace scanning and partial write non-interface driving. The present invention aims at applying this means to the FLCD without changing the GSP graphic software.

SUMMARY OF THE INVENTION

It is an object of the present invention to provide a liquid crystal display system and, more particularly, a ferroelectric liquid crystal display system having improved compatibility with a CRT display system.

It is another object of the present invention to provide an image information control system having improved compatibility with a CRT display system.

According to a first aspect of the present invention, an image information control apparatus and a display system includes first means for recognizing scanning of a position of image information, a first memory unit for, when the first means recognizes scanning of the position of image information, detecting and storing an address accessed to an image information storage memory, with the access being started by the recognition in units of lines in a scanning direction, a second memory unit for storing a line address detected and stored for the first time, and second means for comparing contents of the first means for recognizing scanning of the position of image information with contents of the second memory unit third means interrupts the function of the first means on the basis of the comparison result of the second means, and fourth means interrupts the function of the first means when drawing processing, control of which is started by scanning the position of image information, is ended.

According to a second aspect of the present invention, an image information control apparatus and a display system further includes internal and external synchronizing circuits and means for independently operating the internal and external synchronizing circuits.

According to a third aspect of the present invention, an image information control apparatus and a display system further includes means for automatically generating a scan line control signal of a matrix electrode and an image information transfer control signal by a combination of programmable parameters. In addition, means are provided for operating the two types of control signals independently of each other.

According to a fourth aspect of the present invention, an image information control apparatus and a display system, wherein counting of scanning times of matrix electrode scan lines in the drawing processing, control of which is started by scanning the position of image information, is controlled by a sync signal of a device.

According to a fifth aspect of the present invention, an image information control apparatus and a display system, wherein counting of scanning times of matrix electrode scan lines in the drawing processing, control of which is started by scanning the position of image information, is controlled by a sync signal of a device. The counting is synchronized with an operation of means for automatically generating a matrix electrode scan line control signal and an image information transfer control signal by a combination of programmable parameters.

According to a sixth aspect of the present invention, an image information control apparatus and a display system further includes a third memory unit for storing the number of lines detected upon access to the image information storage memory until the interruption of the first means in accordance with contents of the second memory unit and the drawing processing, control of which is started by scanning the position of image information.

According to a seventh aspect of the present invention, an image information control apparatus and a display system further includes comparing means for comparing contents of the third memory unit with the number of lines detected upon access to the image information storage memory until the interruption of the first means in accordance with contents of the third memory unit, the contents of the second memory unit upon interruption of the function of the first means, and the drawing processing, control of which is started by scanning the position of image information.

According to an eighth aspect of the present invention, in an image information control apparatus and a display system, wherein after partial writing corresponding to the contents of the first memory unit is executed in accordance with the comparison result of the comparing means, a. the number of lines detected upon access to the image information storage memory until the interruption of the first means is stored in the third memory unit in accordance with the contents of the second memory unit and the drawing processing, control of which is started by scanning the position of image information on a display device, and the drawing processing, control of which is started by scanning the position of image information on a display device is ended, or b. access from the drawing processing to the image information storage memory is inhibited, counting of scanning times of scan lines of a device is interrupted, and partial writing corresponding to the contents of the third memory is executed, or c. the presence/absence of overlapping of access data in the scanning direction is detected in accordance with the number of lines detected upon access to the image information storage memory until the interruption of the first means in accordance with the contents of the second memory unit upon interruption of the function of the first means and the drawing processing, control of which is started by scanning the position of image information on a display device, and the contents of the third memory unit, calculation of a partial write area corresponding to the detection result is performed, and partial writing is executed while the counting of scanning times of scan lines on the device is interrupted, or the number of lines detected upon access to the image information storage memory until the interruption of the first means in accordance with the contents of the second memory unit and the drawing processing, control of which is started by scanning the position of image information on the display device is stored in the third memory, the interruption of counting of scanning times of scan lines on the device is released, and the drawing processing, control of which is started by scanning the position of image information on the display device, is ended.

According to a ninth aspect of the present invention, an image information control apparatus and a display system has a function of, when line addresses are stored in the second memory unit, comparing sizes of the addresses in an order of access, and selecting a line address to be stored in accordance with the comparison result.

According to a tenth aspect of the present invention, an image information control apparatus and a display system further includes a comparing unit for, when a line address detected and stored for the first time is to be stored in the second memory unit, comparing two-dimensional coordinates detected and stored for the first time with an area accessed until the drawing processing, control of which is started by scanning the position of image information on the display device, is ended, and comparing two-dimensional coordinates detected and stored previously with an area accessed until the drawing processing is ended.

According to an eleventh aspect of the present invention, an image information control apparatus and a display system further includes a fourth memory controlled in accordance with the comparison result of the comparing unit, wherein image information to a VRAM corresponding to the position of image information on the display device is controlled in accordance with a state of the fourth memory.

BRIEF DESCRIPTION OF THE DRAWINGS

FIGS. 3-1 to 3-3 are flow charts of the mouse font plotting processing applied to the present invention;

DETAILED DESCRIPTION OF THE PREFERRED EMBODIMENTS

Figure 1:
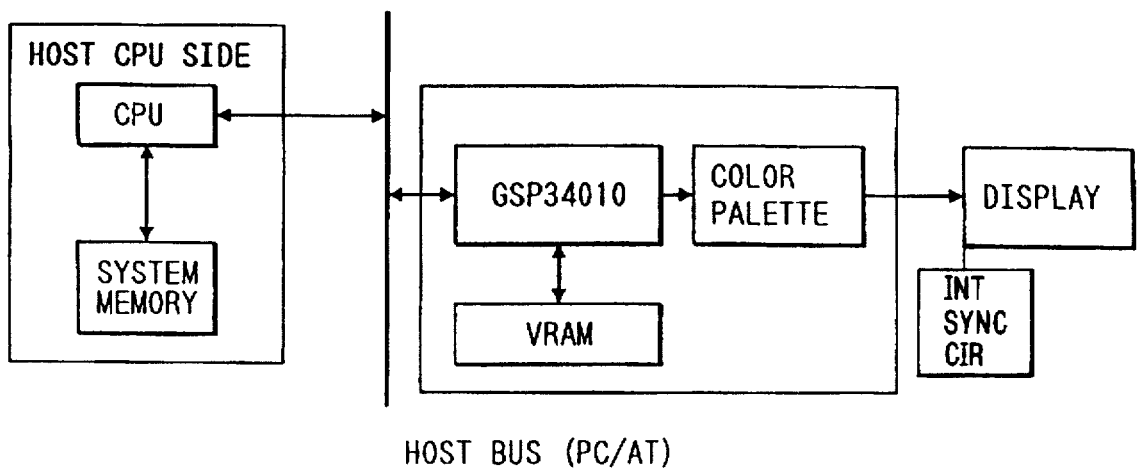
FIG. 1 shows an entire structure of a graphic system for use in describing the present invention.

FIG. 1 is an exemplified schematic view of a graphic system implemented in a PC/AT personal computer system using a CRT display. Graphic information (such as a plotting command and a bit map image) programmed in a Host CPU side is transferred through a Host BUS to a GSP 34010 where the plotting command is translated before being plotted on a VRAM while the bit map image is intact and drawn in the VRAM. The graphic image plotted is supplied through a Display control circuit of the GSP to a Color Palette where it is converted into a color signal for a Display. The color signal is transferred to the Display and displayed thereon. In the graphic system of the type described, the GSP or a graphic controller is directed to manage and control consistently plot information required in the Host CPU side, whereby the burden of the Host CPU side is distributed and relieved.

Figure 2:
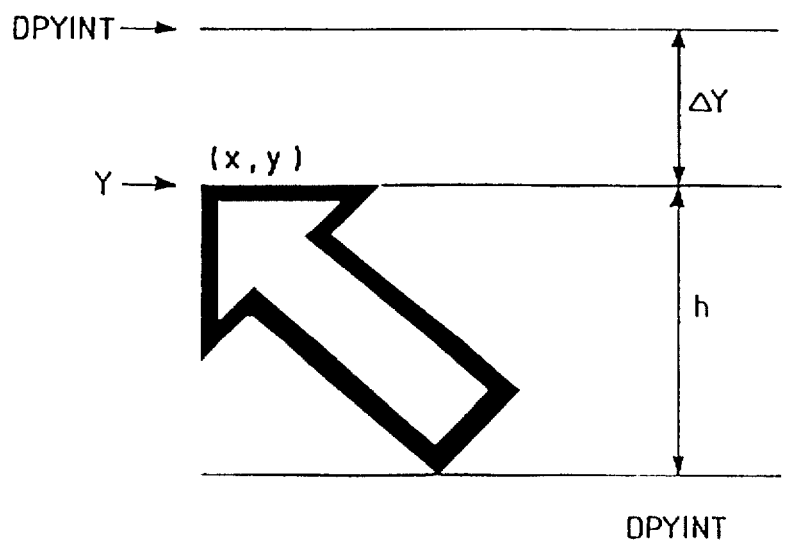
FIG. 2 is a view illustrating the relation between timing and position for a mouse font plotting processing applied to the present invention.
Figures 1, 3:
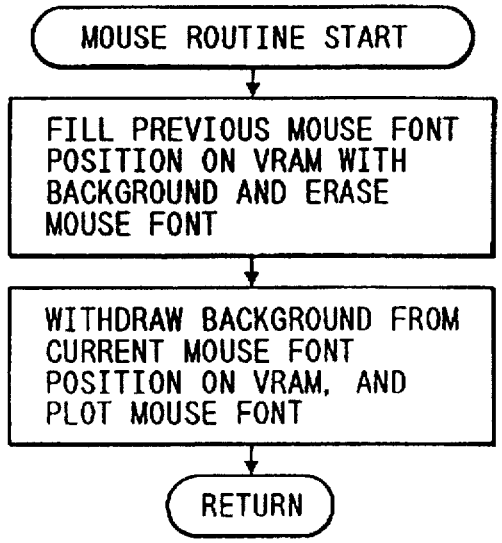
Figures 2, 3:
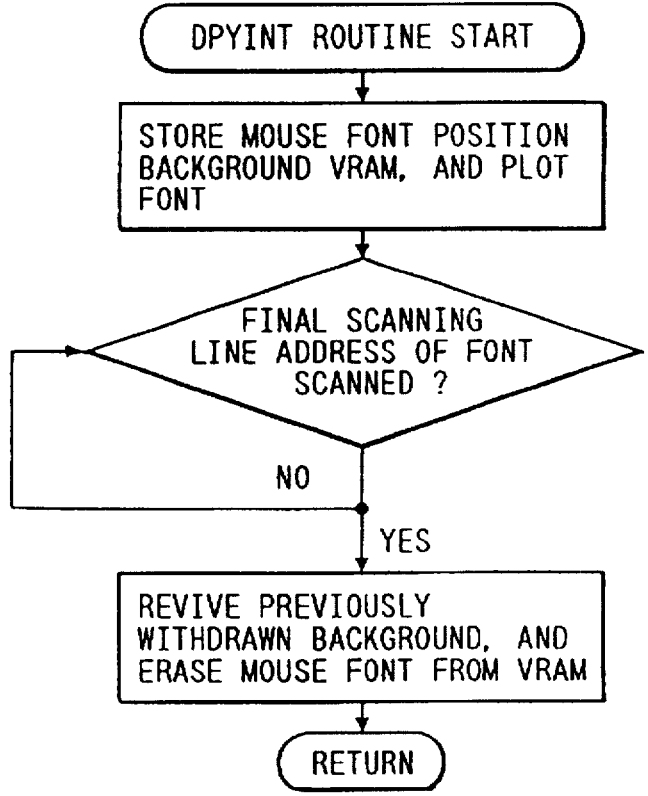
Figure 4:
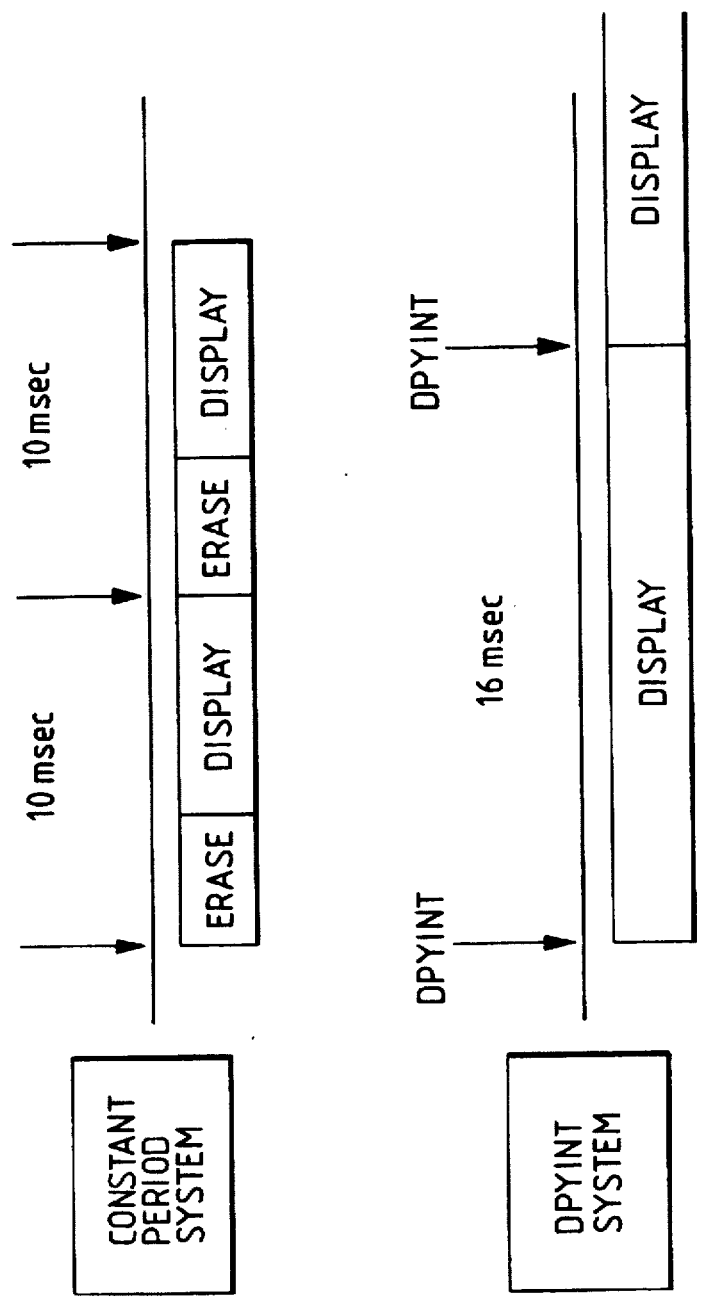
FIG. 4 is a view for use in describing effects achieved by the mouse font plotting processing applied to the present invention.

FIG. 2 shows an example where the GSP 34010 is used for controlling plot and scanning of a pointing device such as a mouse when the display is a CRT. An internal synchronizing circuit is used to control the CRT. The GSP is adapted to program its own plot and display control, so that a program illustrated in FIGS. 3-1 to 3-3 is initiated at the time when a CRT beam scan is reached to a scanning line on a previously programmed DPYINT (i.e., a register designating a timing request of a display interrupt). The major challenge of this processing is to move and display a mouse font smoothly on the CRT without flicker as shown in FIG. 4.

A principle thereof is illustrated in FIGS. 3-1 to 3-3.

With a constant period system shown in FIG. 3-1, if an interruption display request of 100 Hz is received from the mouse, the system waits for a next mouse font plotting interruption after carrying out a series of processing for erasure and displaying the mouse font. This means that the time interval for erasure occurs at every 50 Hz, which appears as the flicker on the display even during the standing mouse font plotting. On the contrary, the DPYINT system in FIG. 3-2 carries out a DPYINT interruption at a constant period when the mouse is at rest. However, as apparent from an algorithm shown in FIGS. 3-1 to 3-3, the mouse font does not disappear from the CRT during the plotting routine and thus no flicker is caused. The mouse font on the VRAM is erased after the mouse font is displayed on the CRT, rather than obligatory erasure of the mouse font from the CRT. The mouse font automatically disappears from the CRT upon the general refresh of the VRAM. Accordingly, the static plotting of the mouse font is continuously displayed on the CRT and the flicker, disadvantageously caused in the constant period system, does not appear. As a result, superior or excellent visibility can be provided. The font is automatically (unconsciously) erased simultaneously with the CRT refresh even during the dynamic mouse font plotting because there is no process of erasure at a constant period, which contributes to smooth movement of the font on the display.

These techniques are, however, those drawn for a display such as the CRT implementing non-interlaced scan with a constant refresh period. A ferroelectric liquid crystal, which is controlled by an external synchronizing circuit, device (FLCD) is more complex and is activated under conditions highly dependent on the temperature at a variable refresh cycle. The scanning is achieved with a combination of multiple interlaced scan (multi-interlace) and "partial refresh" based on the non-interlaced scan. The multiple interlaced scan is applied for avoiding the flicker upon refresh of the whole display by means of breaking the refresh cycle into three or more fields, i.e., interlacing two or more scan lines in one field. The partial refresh method has drawn for dynamic displays on a screen representative of displaying the movement of the mouse. The FLCD is thus more likely to be troubled when being associated with the mouse.

Figure 5:
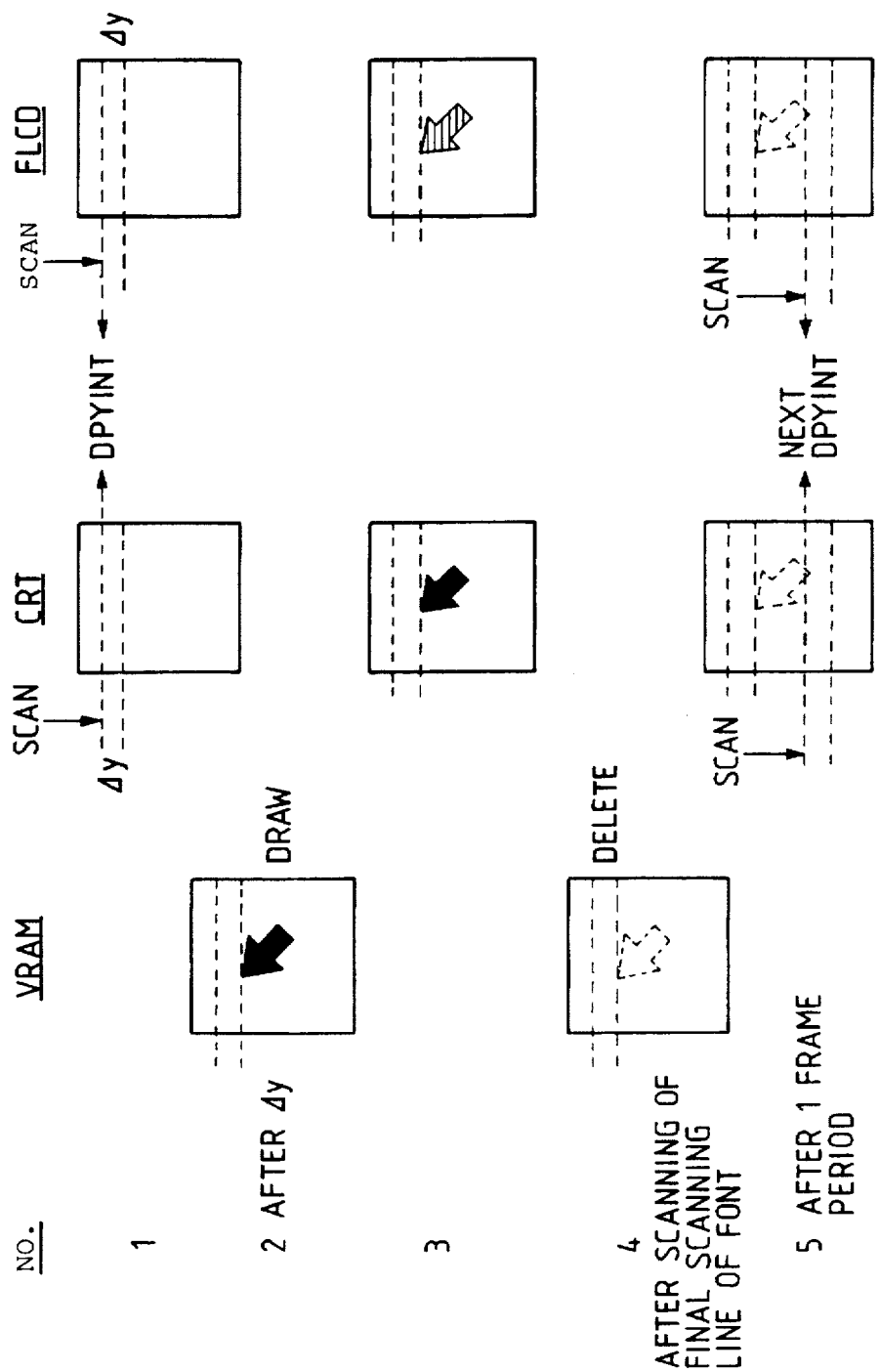
FIGS. 5, 6 and 16 show examples of mouse font displaying states for use in describing the present invention.
Figure 6:
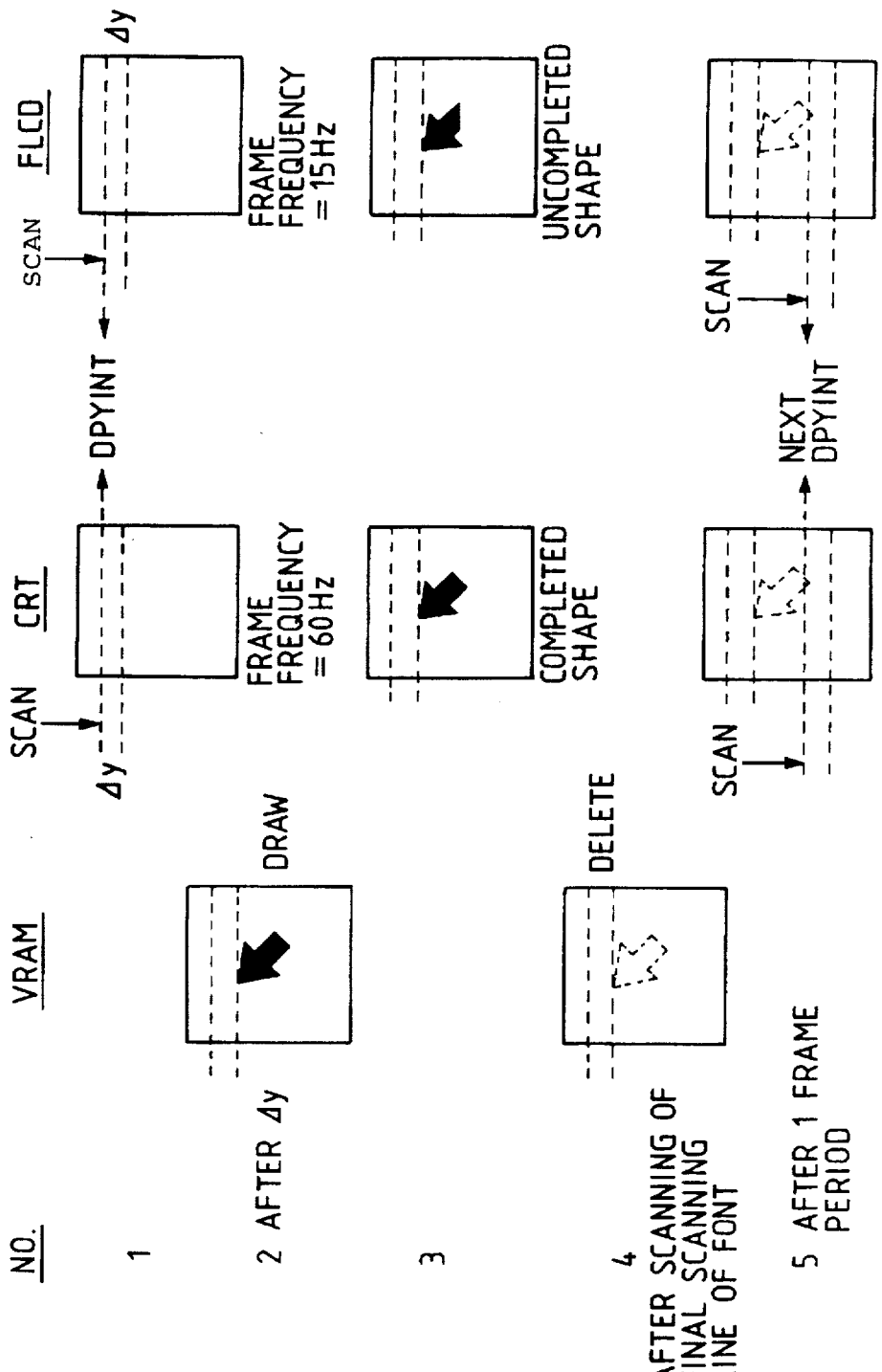

For a better understanding of how the moving mouse is displayed on the screen reference is made to FIGS. 5 and 6 for both types of refresh: multiple interlaced and partial refresh, respectively.

The DPYINT plotting method is further described with reference to FIG. 5. The CRT implementing the non-interlaced scan sets the DPYINT at the scan line upper by Δy than the scan line for the mouse font (FIG. 5; No. 1), where Δy represents the number of scan lines corresponding to the time interval required for plotting the mouse font on the VRAM by the GSP. When the time interval corresponding to Δy is elapsed, the background is stored at the mouse font position in the VRAM to plot the mouse font (FIG. 5; No. 2). Scanning of the CRT is continuously made during the storing and plotting, so that the CRT scanning is reached to the position lower by Δy than the initial position at the time just after the plotting on the VRAM. The mouse font plotted on the VRAM is displayed on the display (No. 3) during the subsequent scanning. When the final scan line for the given font is scanned, the background that is previously stored at the mouse font position in the VRAM is revived and then the font is erased (No. 4). The DPYINT is newly set at every one frame period. If this renewed DPYINT position is located lower than the previous position, the previous mouse font is automatically erased upon the scanning before the next DPYINT is scanned (No. 5). If the renewed DPYINT position is located above than the previously set position, a DPYINT plotting routine, described below, is first carried out and then the mouse font is erased upon the scanning.

On the contrary, the same processing is carried out for the FLCD as in the case with CRT up to when the font is displayed thereon (at the time corresponding to FIG. 5, No. 3) according to the continuous, non-interlaced scan. However, only the interlaced scan lines are displayed actually on the screen, so that the mouse font is absent in the VRAM when the last scan line for this font is scanned. The scanning of another (interlaced) filed may thus be passed with the mouse font remaining incomplete. As a result, the mouse font is displayed for one frame period with being broken along the scan line.

Several methods have been proposed for the loop (decision) of the DPYINT mouse plotting routine in FIG. 3-2. Some methods are directed to count the time with a simple program under the assumption of a CRT refresh rate. In this event, the refresh rate of the typical CRT is 60 Hz while that of the FLCD is 15 Hz. This difference in the refresh rate results in, when the partial refresh is applied, an incomplete mouse font displayed on the FLCD because the mouse font is erased from the VRAM before the font is completely displayed as shown in FIG. 6.

Thus, various trouble may be generated as a result of mere application of the methods drawn for the CRT to the display such as the FLCD implementing the multiple interlaced scan or the partial refresh. The conventional device is disadvantageous and accordingly, the present invention is directed to apply graphic software drawn for the CRT to the display using the multiple interlaced scan or the partial refresh without modifying the software itself.

Figure 7:
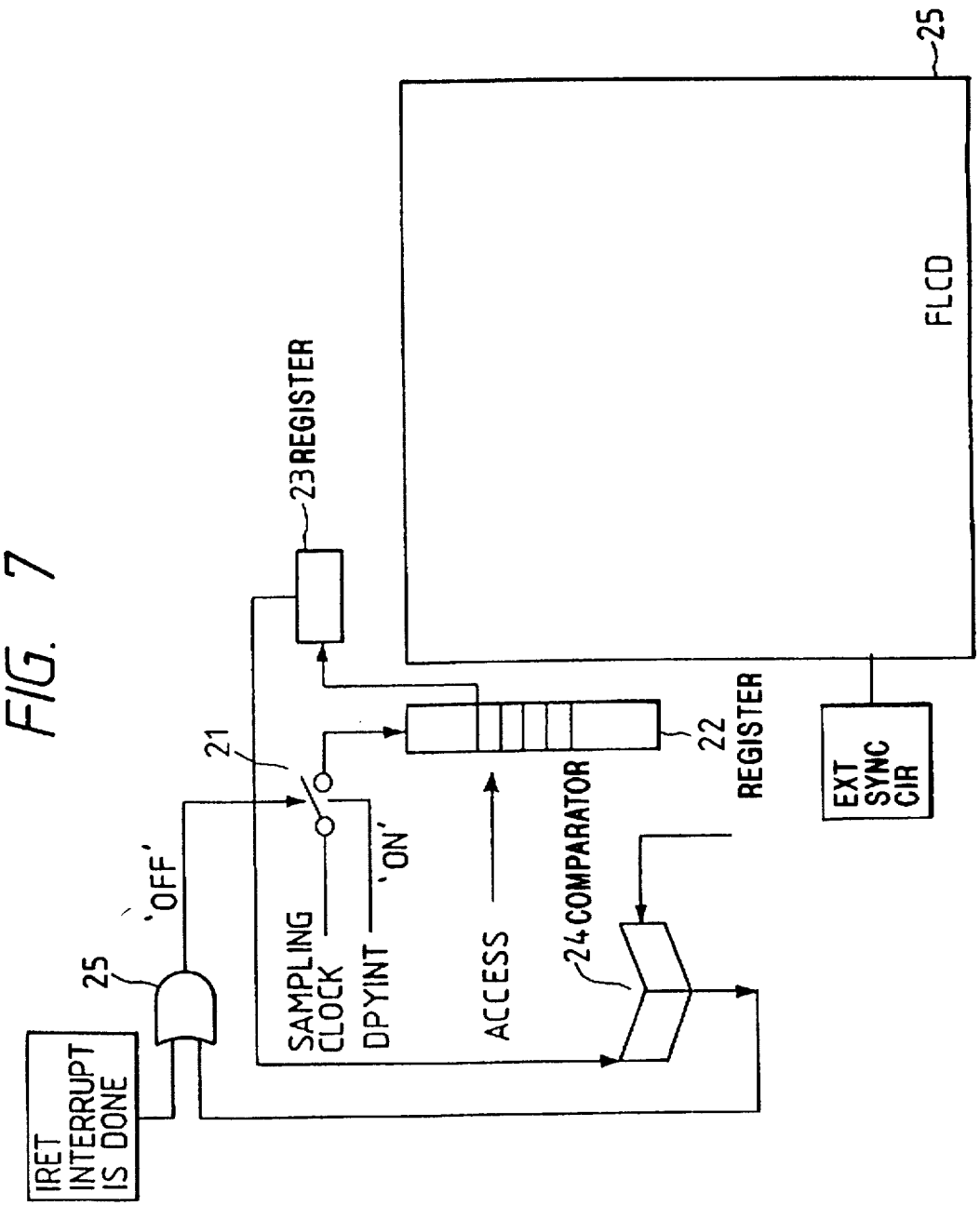
FIGS. 7, 8, 14 and 15 are block diagrams illustrating a control circuit applied to the present invention.

FIG. 7 shows a first embodiment of the present invention. (1) Turn "ON" a gate 21 in response to the interruption generated when the DPYINT previously set is scanned. (2) Start plotting of the mouse font to the VRAM. (3) Store an access to the VRAM in a register 22 that is provided for the scan lines of the VRAM. For example, a flag of one bit, "0" or "1" is provided for every address of the resister section corresponding to the scan line being accessed. In addition, information about the initially accessed scan line is stored in a start address register 23 as a start address. This start address corresponds to a head address during the partial refresh. (4) Compare by a comparator 24 the start address with an address that is actually scanned for every one scanning. (5) Turn "OFF" the gate 21 when the result of comparison indicates that both addresses are identical. Alternatively, (6) the gate 21 is also turned "OFF" when an interrupt routine is ended.

In particular, why the gate 21 is turned "OFF" at (5) is to avoid redundant or overlapped partial refresh by means of excluding any other VRAM access generated during the partial refresh. If the gate is allowed to receive other access, an access for erasure of the font on the VRAM is detected after the font is displayed during the partial refresh and the font just after being displayed is erased in response to the last access. The gate 21 is thus turned "OFF" to overcome such a problem.

In addition, the function described in (6) is provided because various application other than mouse plotting can be expected for the DPYINT routine. An example of such application is a timer routine utilizing a constant refresh rate of the CRT. In this case, the routine is escaped after interruption of DPYINT without access to the VRAM. Only the end of the interruption routine is detected and it is possible to recognize that the interruption is a routine with no access to the VRAM. In such a case, no partial refresh is made to the FLCD.

Relation Between the Partial Refresh and the Application (Synchronous Partial Refresh)

Described now is one which should be taken into consideration regarding to the partial refresh. It is assumed that the partial refresh is non-interlaced type of refresh carried out according to the detected result of the register 22 VRAM access.

The gate 21 in FIG. 7 is turned "OFF" and image data are successively supplied, when the VRAM is accessed, from the VRAM to the FLCD and displayed thereon as the access proceeds in the scanning direction detected in the register 22. In this event, when the GSP carries out a refresh operation at the CRT rate during execution of the partial refresh by the FLCD, the subsequent DPYINT processing is accepted before completion of the plotting if the completion of the scanning is monitored at the CRT rate because of the difference of the operation speed between the CRT and the (slower) FLCD. With this respect, a scan line monitor shown in FIG. 3-2 should be a monitor for an actual FLCD scan line. This method is referred to as the synchronous partial refresh. More particularly, the synchronous partial refresh is meant to synchronize the FLCD scanning with a program such that execution of any other program is delayed until the plot scanning on the FLCD is completed.

Accordingly, an actual DPYINT font plotting routine for the FLCD is executed through the process as shown in FIG. 3-3.

A major difference between this and the one for the CRT shown in FIG. 3-2 is the portion enclosed in the rectangle depicted by a dotted line, which is achieved by means of adding a circuit as shown in FIG. 7. This additional processing is carried out by a circuit according to the present invention and no modification is made on application software of other software in the GSP. Thus, the compatibility of the software is intact.

Erasure of the Mouse Font on the FLCD

When a method of erasing the mouse font with a prerequisite that the non-interlaced scan is used is applied to the display implementing the multiple interlaced scan, the mouse font is plotted with being separated on a slit in the scan line direction as mentioned above. To overcome this, the circuit shown in FIG. 7 is improved into the one shown in FIG. 8. A major modification is a register 31 provided after the register 23 for storing the address accessed to the VRAM at the initial instant of the DPYINT interruption processing. As a result of this, a control method (sequence flow) is also modified.

(1) DPYINT turns "ON" the gate 21 and stores in the register 22 the region accessed in the scan direction of the VRAM.

(2) The start scan address accessed is compared with the current scan line by the comparator 24.

(3) When the comparison result indicates coincidence between the two, then the gate 21 is turned "OFF." (No alternation is made hereinabove)

(4) The partial refresh is started and the number of the scan lines is counted through a register 22→(computer) →count processing.

(5) A) A start address and a count value are stored in the (register 31).

(6) The first DPYINT processing is terminated.

(7) The second and later DPYINT processing repeats the operations in (1) through (4) and then is executed according to the following different operation.

(8) A comparator 26 compares the previous value obtained in A) and the current value in (4). Depending on the comparison result, the control branches to either B) or C).

B) [For the Comparison Result indicating Equal or "="]
This condition corresponds to where the mouse is at rest or moved horizontally.

(9) The present comparison result is stored in A) for the subsequent comparison.

(10) The interruption processing is escaped.

C) [For the Comparison Result indicating Not Equal or "≠"]
This condition corresponds to where the mouse is moved in any other direction than horizontal or the font size is changed. The following is for the former case.

Figure 9:
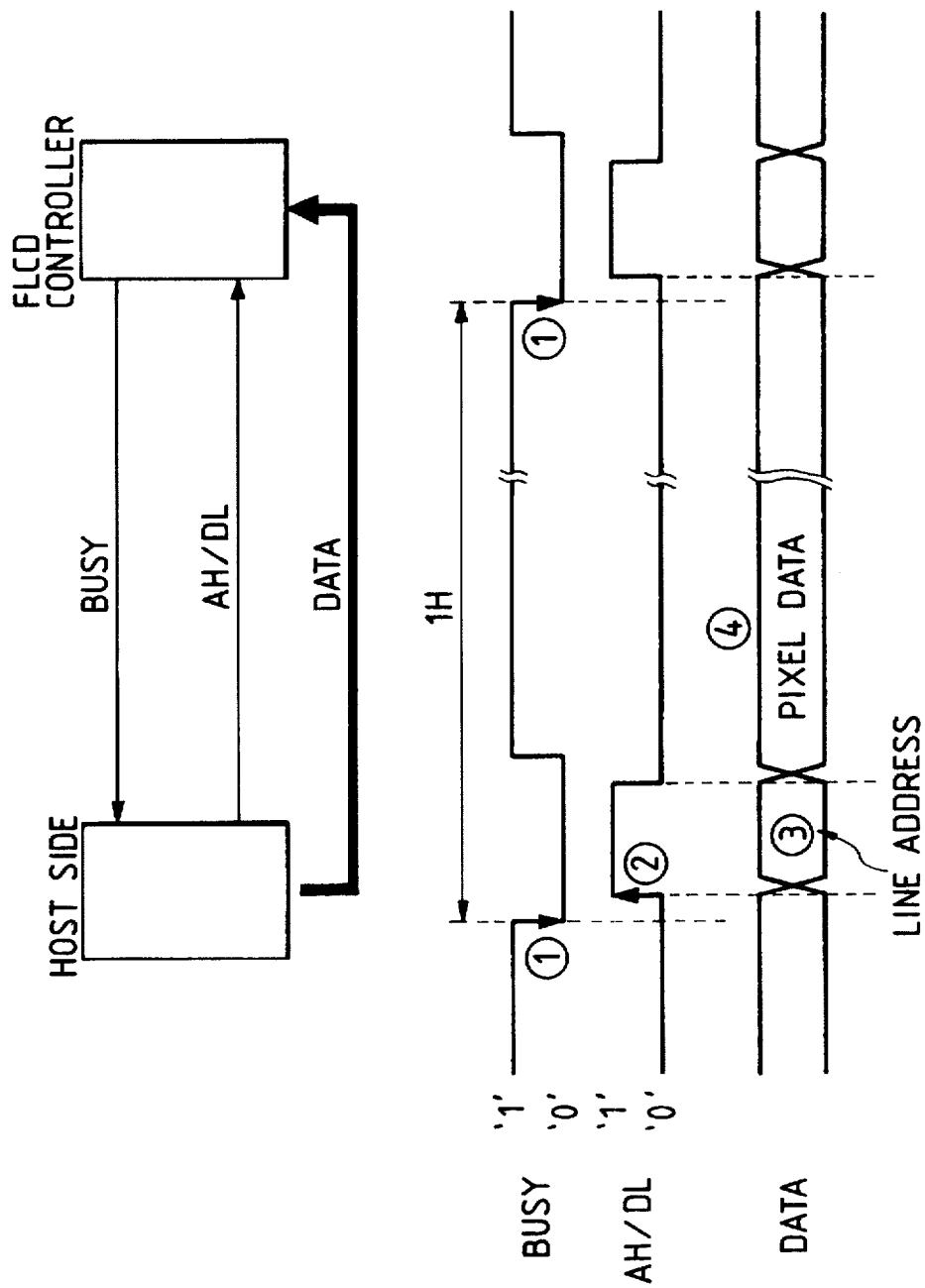
FIG. 9 illustrates a fundamental principle of operation of driving control for FLCD.

(11) Access to the VRAM from an application is inhibited to execute the synchronous partial refresh and the self-running refresh control in the GSP is interrupted. The subsequent refresh control is passed to the FLCD control, i.e., the refresh control in synchronism with the refresh rate of the FLCD. This control is referred to as "BUSY synchronous refresh control" hereinbelow. An example of the BUSY synchronous refresh control is shown in FIG. 9. Description of FIG. 9:

(1) An FLCD controller notifies the HOST side of release of a BUSY condition.

(2) The Host side returns back an Acknowledge to the FLCD controller.

(3) A (scan line) line address data is sent.

(4) An image data is sent.

After 1H (one horizontal scan period), the operation is repeated from (1). This 1H is controlled by the FLCD side, which is comparable with the one-way self-running control as is used in the conventional CRT refresh. In other words, the 1H is controlled by the intercommunication between the FLCD and the HOST side. This is the outline of the BUSY synchronous refresh control method for the FLCD.

(1) The following partial refresh that is carried out an is branched, depending on the result of an overlapping/separation conditions.

Figure 10:
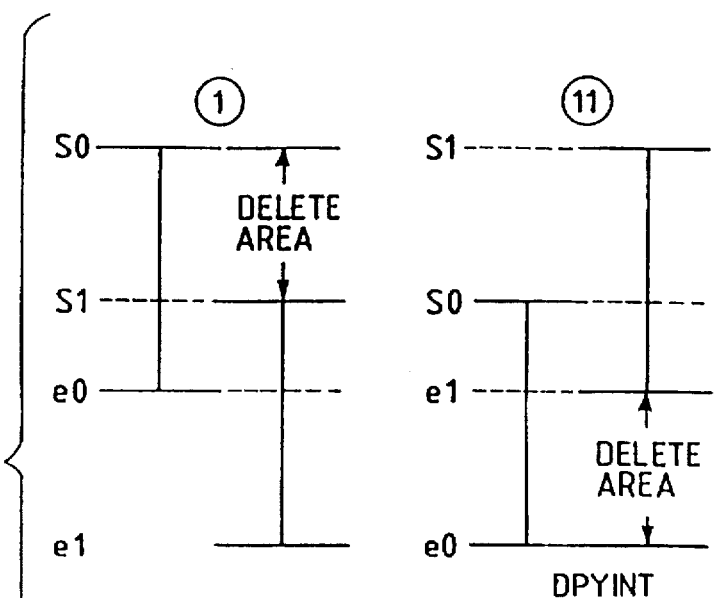
FIGS. 10, 12A, 12B, 12C and 13 are exemplified views for use in describing a principle of operation of the mouse font plotting processing according to the present invention.

This is described with reference to FIG. 10. In this figure, s0 and e0 represent a start line and an end line, respectively, where the mouse is positioned previously while s1 and e1 represent the start line and the end line, respectively, where the mouse is to be positioned. In addition, 1 is for the case where the current position of the mouse is below the last position of it while 11 is for the case where the current position thereof is above the last position of the same.

Overlapping Condition:

$$|s0 - s11 + |e0 - e11 < |count0 + count11|$$

$$(|s0 - s11 + |s0 - s1 + count0 - count11 <$$

$$|count0 + count11)$$

Separation Condition:

$$|s0 - s11 + |e0 - e11 > |count0 + count11|$$

$$(|s0 - s11 + |s0 - s1 + count0 - count11 >$$

$$|count0 + count11)$$

When the overlapping condition is satisfied, then the partial refresh is:

| | | |
|---|---|---|
| Case I | ... s0 − s1 < 0 | |
| | Partial Refresh Start Address | ... s0 |
| | Partial Refresh Scan Line | ... |s0 − s11, |
| Case II | ... s0 − s1 > 0 | |
| | Partial Refresh Start Address | ... s1 + count1 |
| | Partial Refresh Scan Line | ... |e0 − e11 |
| | | = |s0 − s1 + |
| | | count0 − count11 |

When the separation condition is satisfied, then the partial refresh is:

| | |
|---|---|
| Partial Refresh Start Address | ... s0 |
| Partial Refresh Scan Line | ... count0, |

-continued

| and | |
|---|---|
| Partial Refresh Start Address | ... s1 |
| Partial Refresh Scan Line | ... count1. |

These continuous two partial refreshes are made. The former one is for erasing the font at the previous position and the latter is the partial refresh for displaying the font at the current position.

(2) Values of s0 and count0 are renewed into values of s1 and count1, respectively.

(3) The self-running CRT refresh operation in the GSP being interrupted is resumed and an access from the application to the VRAM is enabled.

As mentioned above, the partial refresh for the erasure of the mouse font is provided and carried independently, which overcomes the problem of appearance of the font being separated in the scan line direction of the multiple interlaced scan. In addition, the mouse font is displayed normally by the partial refresh. This is achieved by the circuit of simple structure obtained by less modifying the conventional one for the CRT.

[Embodiment 2]

Figure 11:
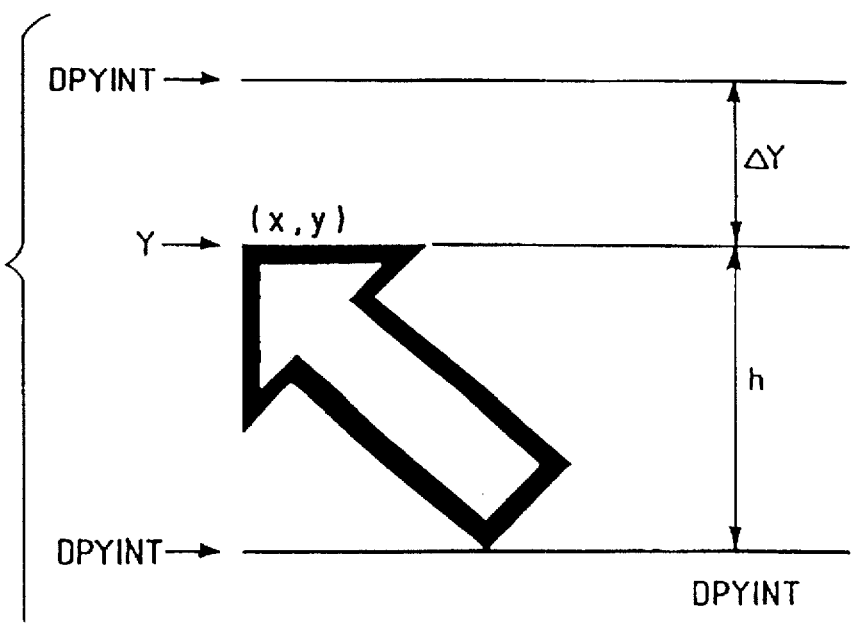
FIG. 11 is a view illustrating relation between timing and position for another mouse font plotting processing according to the present invention.

FIG. 11 is a view for use in describing a method of DPYINT interruption mouse font plotting processing carried out by using two DPYINTs. A first DPYINT is equal in purpose and function to the first embodiment. A second DPYINT corresponds to a portion for monitoring the actual scan line address (a method of realizing the decision loop in FIG. 3-2) in the aforementioned embodiment. More specifically, the decision loop in FIG. 3-2 is realized by means of using the end scan line address of the font as a second DPYINT value. In this event, the following additional decisions are required therefor though a fundamental structure of the circuit is equal to that shown in FIG. 8.

Additional Decision:
(1) The DPYINT address is compared with the scan line address that is accessed first.
(2) i) When the comparison result is<"0" (the DPYINT is located above that at the initial access), then the similar processing is carried out to that in the aforementioned embodiment.
(2) ii) When the comparison result is>"0" (the DPYINT is located below that at the initial access), then no operation is made and the processing is terminated.

In an original (CRT) of the present embodiment, the mouse font is deleted from the VRAM by the second DPYINT. Thus the previous mouse font is automatically deleted from the CRT before the subsequent DPYINT by the self-running non-interlaced refresh. However, a certain problem is caused in the FLCD where the multiple interlaced scan and the partial refresh are applied due to the above mentioned reasons. In the present embodiment, no trouble is caused on the erasure and display of the font. It is apparent that the present invention is also useful when two DPYINT is applied.

[Embodiment 3]

Figure 8:
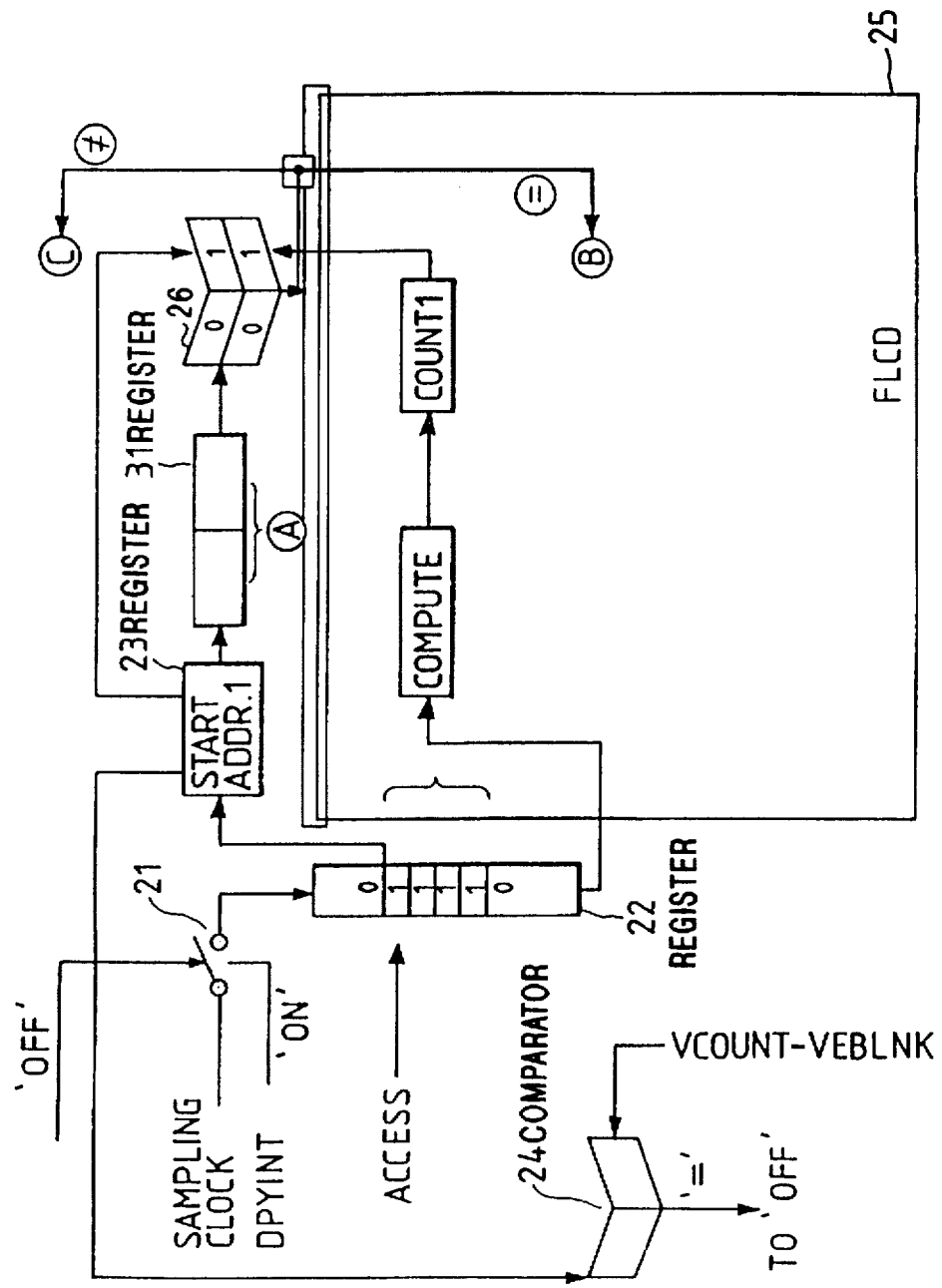
Figure 12A:
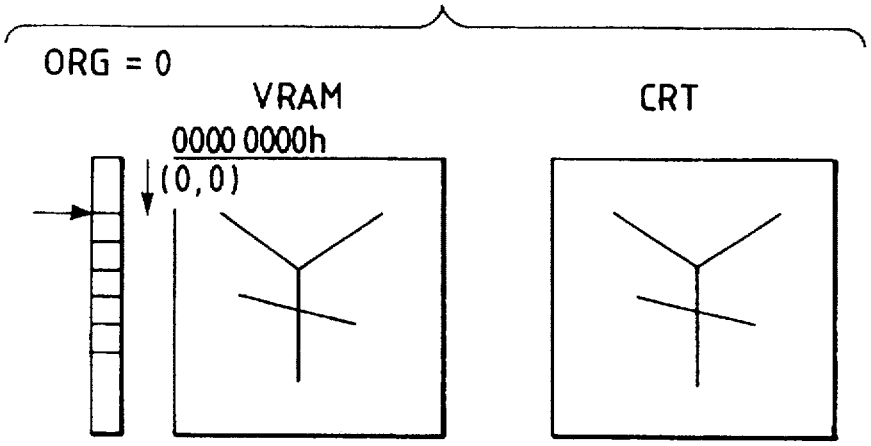
Figure 12B:
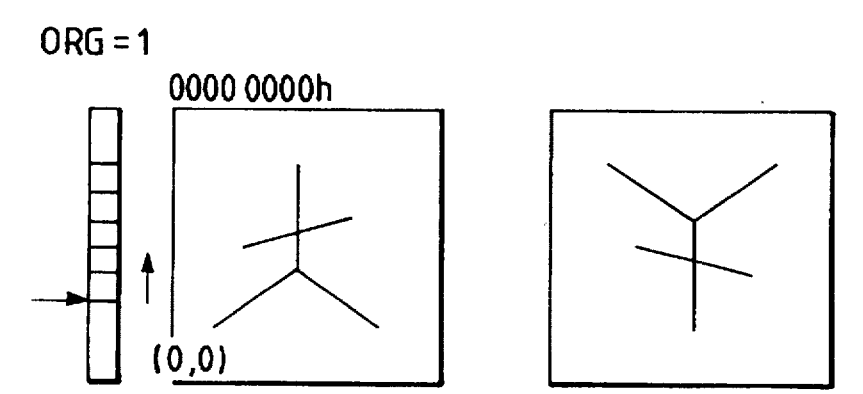
Figure 12C:
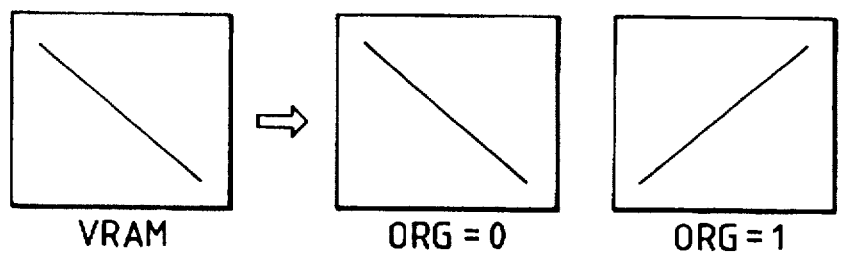
Figure 13:
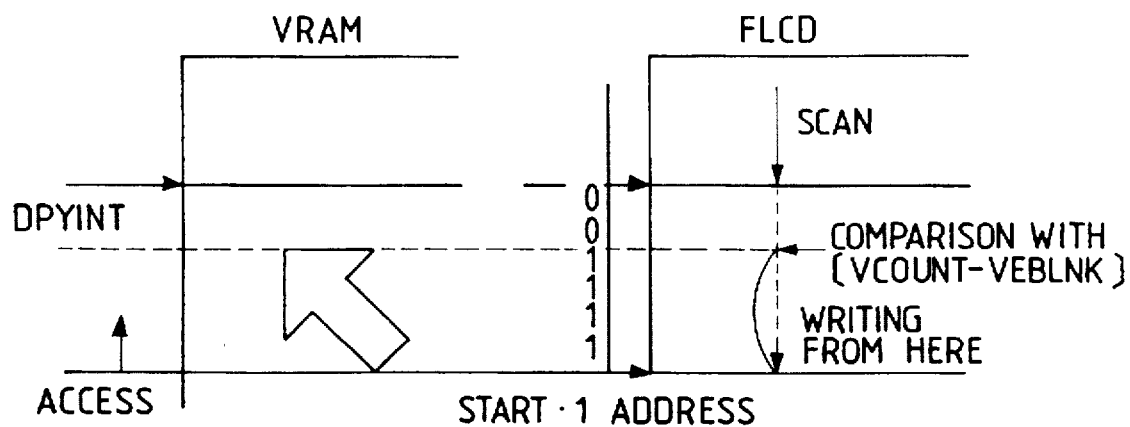
Figure 14:
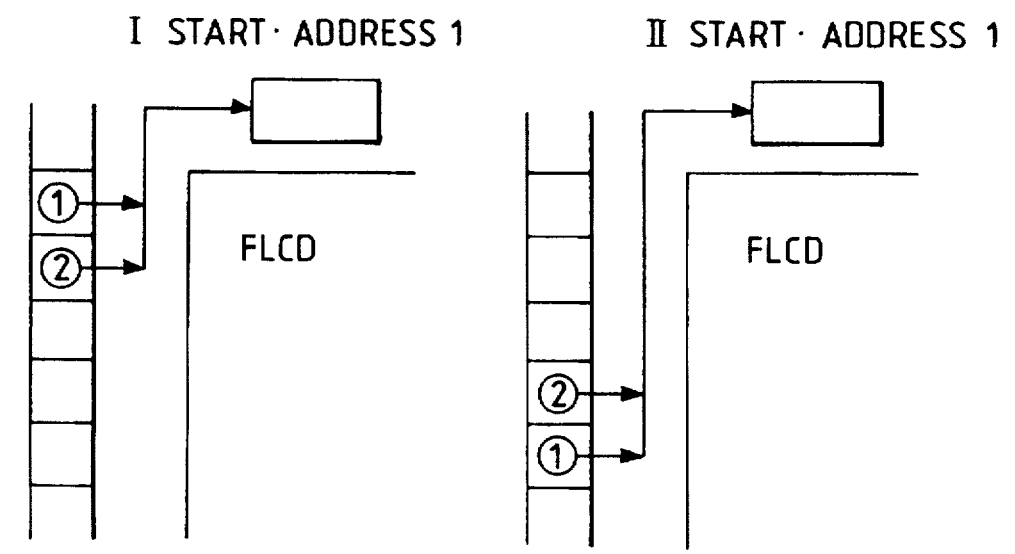

The GSP has a function to reverse the direction of a normal direction of drawing of the image information relative to a rectangular space (an X-Y space defined by the horizontal sides X and the vertical sides Y) of the VRAM. An embodiment for this case is described with reference to FIGS. 12A to 12C. When a font "Y" in FIGS. 12A to 12C is an "ORG" bit=0 of the GSP (with ORG relating to a parameter controlling an origin of the screen coordinate system), a normal drawing is performed and the result is as shown in FIG. 12A. When the ORG bit=1, then the drawing to the VRAM is reversed and the result is as shown in FIG. 12B. It is noted that no change is found on the font actually displayed. This is because the "ORG" bit function is for defining a logical way of setting an original point of the X-Y space and creating the coordinate, so that it is prepared for defining the relation between the refresh of CRT and the drawing to the real address of the VRAM in view of the application. However, it is impossible to comply with this function by merely adding a conventional circuit. For example, when the font "Y" is drawn with the "ORG" bit=1, the plotting and drawing for FIG. 12B to the VRAM after the DPYINT produces an interruption by the scan is carried out upward from the bottom position as shown in FIG. 13. The register 22 shown in FIGS. 7 and 8 is normally capable of detecting the access from the top, as shown in FIG. 14, to (1) and (2) in order of I. On the contrary, when the font is drawn with the "ORG" bit=1, the access is detected from the bottom to (1) and (2). Accordingly, the bottom address is considered as the start address when using a circuit that determines the start address for the partial refresh in accordance with the order of the access. In this event, the end address for the access is a position somewhat lower than the DPYINT. The partial refresh is not carried out when the start address for the access is monitored at the first decision in FIG. 3-3. Thus, the gate 21 is not turned "OFF." In addition, the second decision for monitoring the end address of the font is carried out independent of the partial refresh, so that the font is deleted from the VRAM when this condition is reached. The partial refresh is started at the time the bottom line address=the start address is reached. To start the partial refresh from the start address, it is necessary to do so in the scan direction from the bottom to the top. Besides, the partial refresh is carried out though no font is present in the VRAM. This means that the partial refresh is carried out with the mouse font not being displayed on the FLCD. To overcome this problem, the following decision function is provided when the scan line address is stored in the start address register shown in FIGS. 7 and 8.

In FIG. 14, case I : if (1)<(2) then start address register 1=(1) (leave),
case II : if (1)>(2) then start address register=(2) (replace).
Entering the DPYINT processing, the start address for the partial refresh is the value obtained at the instant when the scan is reached to the content of the address register 1. In addition, the gate 21 is turned "OFF" and a normal partial refresh is carried out.

In this embodiment, it is possible to make a similar decision with the content of the "ORG" bit in FIGS. 12A to 12C. In the GSP, a PIXBLT or the like is used as one of the commands for plotting access to the VRAM, so that the same operation as the "ORG" function can be achieved according to the content of the control bit (the ninth bit PBV of the CONTROL register) upon execution of this command. Thus, this embodiment is preferable by the considerations of the compatibility of the software as well as the structure and the scale of the additional circuit(s).

[Embodiment 4]
Countermeasurement of the Standing Mouse

Figure 15:
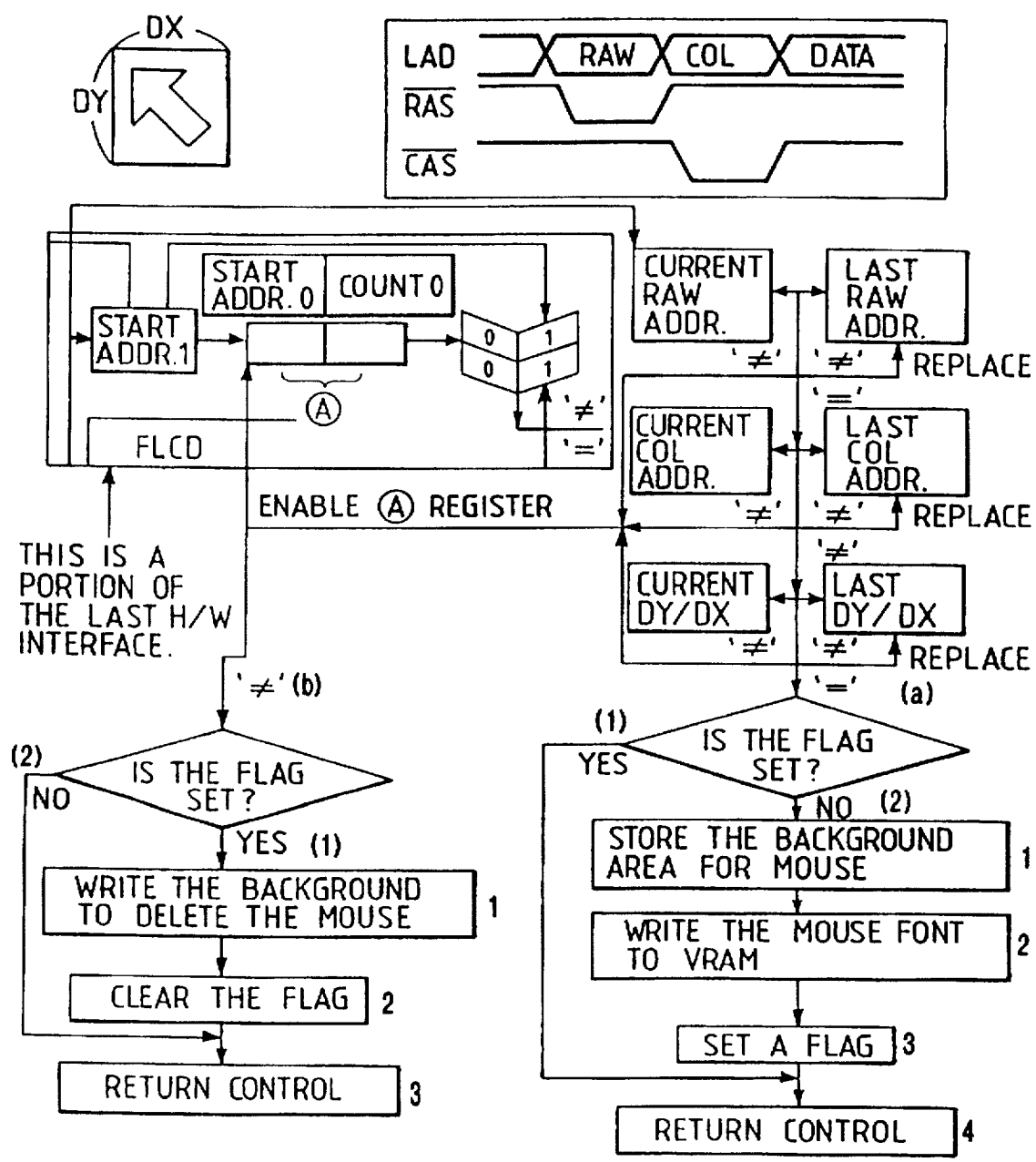

It has been described to cope with troubles relating to delete/display of the mouse font during rest and movement by means of adding the register 31 and the comparator as shown in FIG. 8. However, the deletion/display of the mouse font due to the DPYINT interruption processing for every one field of the multiple interlaced scan is made with a difference in the number of accesses being more significant as the level of the interlaced scan is higher as compared with other normal refresh regions. For example, for the four-interlaced scan of frame frequency of 15 Hz and the field frequency of 60 Hz, the number of accesses is four times larger, provided that the refresh region is equal to 1. Thus, the difference in the number of accesses becomes significant when using the multiple interlaced scan of a higher order. As a result, a contrast may be generated between the mouse font display region and the normal refresh region, which the contrast is appeared as a crosstalk. To avoid this, FIGS. 8 and 14 are modified with the addition of a circuit as shown in FIG. 15. This additional circuit monitors any change of the mouse coordinates and the font size. Whether the mouse font is left on the VRAM is determined according to the monitoring result. In addition, a flag register provided exclusively for this circuit is controlled. When the mouse is at rest, the mouse font plotting partial refresh is basically skipped only once. The mouse font plotting partial refresh is not carried out in response to the DPYINT interruption subsequently caused. Described below is the actual structure of the circuit and the function thereof.

In the mouse font plotting processing in response to the DPYINT interruption of the original (CRT), the font is deleted from the VRAM after displaying the same on the display. However, with the present circuit, the normal refresh is carried out when the mouse is at rest rather than carrying out the mouse font plotting partial refresh. However, the mouse font disappears from the display when the normal refresh is carried out with no mouse font present in the VRAM. Described is an additional circuit control unit and the mechanism thereof to overcome the above problem.

In the upper portion of FIG. 15, as an example, a VRAM access and the X-Y address thereof are monitored during the DPYINT interruption according to the combination of the content of an LAD address line supplied from the GSP and a RAS.CAS signal lines. In addition, a rectangular region in the VRAM accessed during the DPYINT interrupting processing and a DX/DY are also stored and are used as a font size. Further, at least one bit is provided as an exclusive flag register. This allows monitoring of the change, if any, of the two-dimensional coordinates and the font size of the mouse font at every time of DPYINT interruption. The following decision and the processing thereof can be made.

When the coordinates and the font size of the mouse font are equal,
  (1) for a case where the exclusive flag is already set:
    1. the mouse font plotting partial refresh is not carried out and returned to the refresh.
  (2) for a case where the exclusive flag is not set:
    1. the region corresponding to the mouse position is stored as the background,
    2. the mouse font is stored in the VRAM,
    3. the exclusive flag is set, and
    4. return to the refresh.

When either one of the coordinates and the font size of the mouse font is not equal,
  (1) for a case where the exclusive flag is already set:
    1. the background stored at a.(2)-1 is drawn in the VRAM to erase the mouse font on the VRAM,
    2. the exclusive flag is set, and
    3. return to the refresh.
  (2) for a case where the exclusive flag is not set:
    1. return to the refresh (no operation is made as the countermeasurement for the standing mouse).

While no font is essentially stored in the VRAM except when the font is displayed on the display, this embodiment is based on the operation with the font remaining in the VRAM for the countermeasurement of the standing mouse.

[Embodiment 5]

Figure 16:
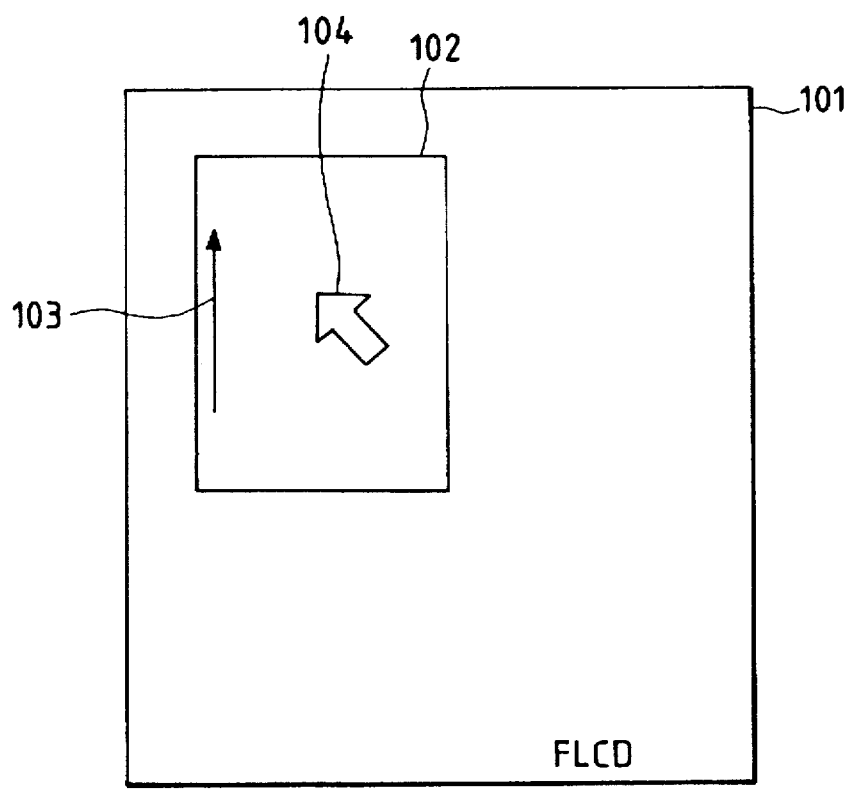
Figure 17:
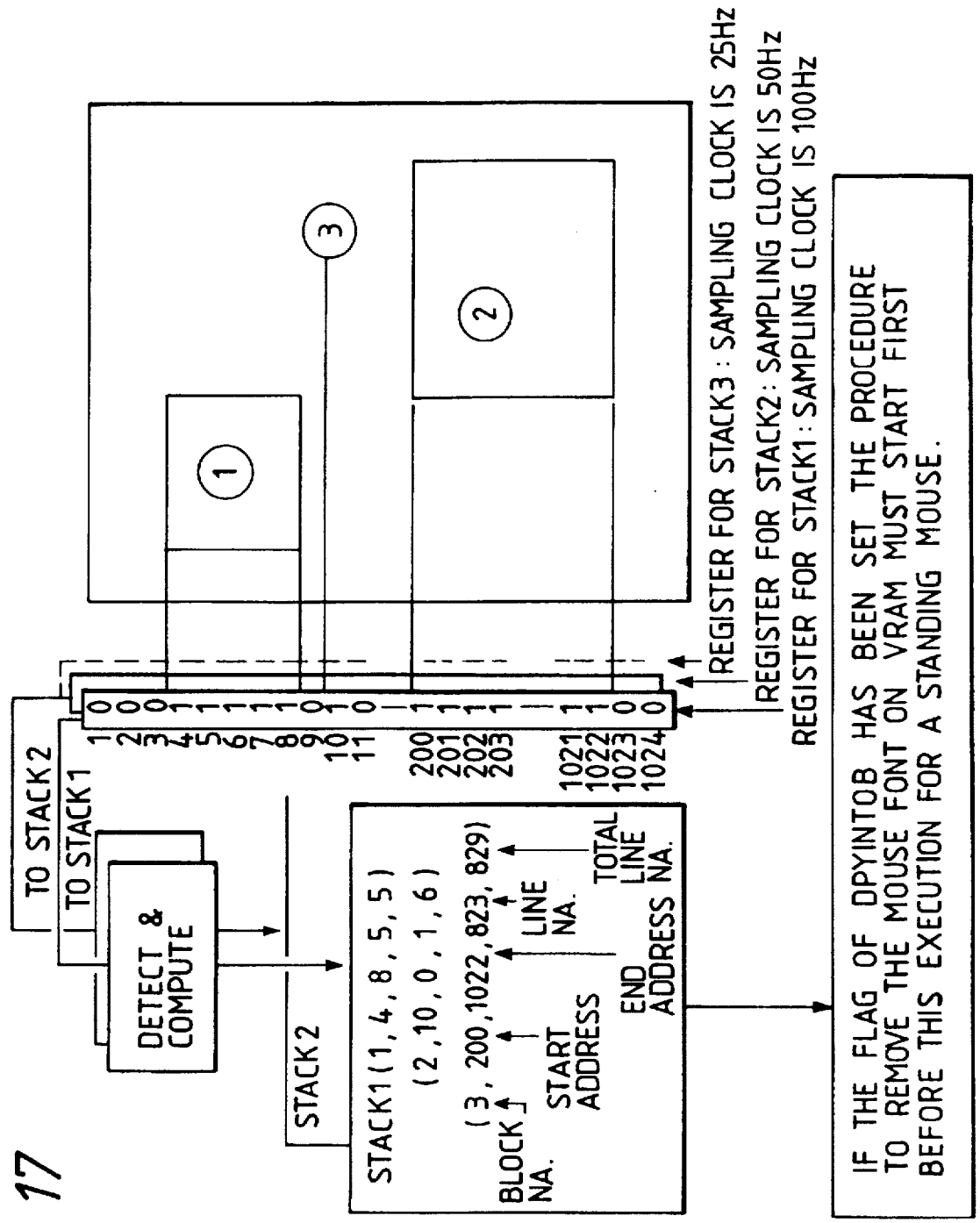
FIG. 17 shows an exemplified structure of a partial refresh control circuit which is used for the mouse font plotting processing according to the present invention.

The above mentioned DPYINT mouse font plotting interruption processing has been described with the prerequisite that the processing is single with no other partial refresh being made. In practice, it is expected that the mouse font may be present within a certain rectangular region that is scrolled on the display as shown in FIG. 16. The countermeasurement circuit described in the fourth embodiment is not sufficient for such a case. More specifically, the mouse font is left in the VRAM corresponding to the scrolled region due to the standing mouse countermeasurement circuit even when the mouse font is at rest within the scrolled screen. The mouse font, that should be at rest, is scrolled as the screen is scrolled. This is because the above mentioned standing mouse countermeasurement circuit is not capable of deciding the partial refresh request other than the standing mouse after the DPYINT interruption. With this respect, the exclusive flag described in conjunction with FIG. 16 is monitored not only by the partial refresh processing caused as a result of interruption but also from a normal partial refresh controlling circuit. If the flag is set, the mouse font is deleted from the VRAM before the normal partial refresh processing is carried out. FIG. 17 is given as an example of the normal partial refresh control circuit. Described now is an operational principle and a mechanism thereof.

A plurality of registers illustrated in the central portion of FIG. 17 monitor the access to the VRAM at the interval of a sampling clock of 100 Hz for each. Either "0" or "1" is stored in the register. The other register stores the result of the VRAM access monitored at a different sampling interval. In the figure, encircled numerals 1, 2 and 3 are stored in the register as latest accesses to the VRAM. Each numeral depicted beside the register represents to the number of the scan line of the display for indicating the correspondence that the content of the flag ("0", "1") in the register corresponds to which scan line. The flag in each register is checked at the block of "detect & compute" and is analyzed for analyzing a new movement occurred on the display. For example,

--- an actual accessed order: 1 → 2 → 3
is recognized as the result of analysis:
  a result of analysis : three blocks of 1, 3 and 2

--- and each of them is analyzed for the start address, the end address, the number of the scan line and the number of total scan lines of the block. The analytical results are stored in stack 1 and stack 2 of the associated register. The number of blocks is given for convenience from the upper portion of the display and the order itself has no meaning. In addition, the number of total scan lines represents the total number of detected access through the block to the VRAM during one sampling period.

After sampling and analyzing according to the above mentioned analytical results, the partial refresh is carried out according to that content. When the aforementioned embodiment 5 is applied to this example, the exclusive flag provided in FIG. 17 is checked just before execution of the partial refresh. If the flag is set, then the background is refreshed at the mouse font position on the VRAM to delete the mouse font, following which the partial refresh is carried out.

It is apparent that the embodiments of the present invention may be used independently in the purpose and the effect thereof or may be combined adequately. While the present invention has thus been described in conjunction with the mouse font plotting processing having a DPYINT interruption function of the GSP, the structure of the present invention is not limited thereto. For example, if a graphic controller has an exclusive circuit for the mouse font plotting processing and carries out processing in preference to the VRAM, initiation of the operation of this exclusive circuit is considered to be equivalent to the DPYINT interruption. Thus, the same structure and countermeasurement is required for solving the problem caused in the display system using both the multiple interlaced scan and the partial refresh.

What is claimed is:

1. An image information control apparatus comprising:
   a. first means for recognizing scanning information of a position of image information and storing such information;
   b. a first memory unit for, when said first means recognizes the scanning information of a position of the image information, detecting and storing an address accessed to an image information storage memory, the access being started by the recognition in units of lines in a scanning direction;
   c. a second memory unit for storing an initial line address detected and stored;
   d. second means for comparing contents of said first means for recognizing the scanning information of the position of image information with contents of said second memory unit;
   e. third means for interrupting the function of said first means on the basis of the comparison result of said second means; and
   f. fourth means for interrupting the function of said first means when drawing processing is ended, with control of drawing processing started by scanning the position of image information.

2. An apparatus according to claim 1, further comprising internal and external synchronizing circuits, and means for independently operating said internal and external synchronizing circuits.

3. An apparatus according to claim 1, further comprising:
   means for automatically generating a scan line control signal of a matrix electrode and an image information transfer control signal by a combination of programmable parameters; and
   means for operating the control signals independently of each other.

4. An apparatus according to claim 1, wherein counting of scanning times of matrix electrode scan lines in the drawing processing is controlled by a sync signal of a device, with control of the drawing process started by scanning the position of image information.

5. An apparatus according to claim 1, wherein counting of scanning times of matrix electrode scan lines in the drawing processing is controlled by a sync signal of a device, with control of the drawing process started by scanning the position of image information, and the counting is synchronized with an operation of means for automatically generating a matrix electrode scan line control signal and an image information transfer control signal by a combination of programmable parameters.

6. An apparatus according to claim 1, wherein said apparatus has a function of, when line addresses are stored in said second memory unit, comparing sizes of the addresses in an order of access, and selecting a line address to be stored in accordance with the comparison result of said second means.

7. An apparatus according to claim 1, further comprising a comparing unit for, when an initial line address detected and stored is stored in said second memory unit, comparing two-dimensional coordinates detected and stored for the first time with an area accessed until the drawing processing is ended, with control of the drawing processing started by scanning the position of image information on said display device, and comparing two-dimensional coordinates detected and stored previously with an area accessed until the drawing processing is ended.

8. A system according to claim 1, wherein counting of scanning times of matrix electrode scan lines in the drawing processing is controlled by a sync signal of a device, with control of the drawing process started by scanning the position of image information.

9. A display system comprising:
   a. a display panel;
   b. first means for recognizing scanning information of a position of image information and storing such information;
   c. a first memory unit for, when said first means recognizes the scanning information of the position of image information, detecting and storing an address accessed to an image information storage memory, the access being started by the recognition in units of lines in a scanning direction;
   d. a second memory unit for storing an initial line address detected and stored;
   e. second means for comparing contents of said first means for recognizing the scanning information of the position of image information with contents of said second memory unit;
   f. third means for interrupting the function of said first means on the basis of the comparison result of said second means; and
   g. fourth means for interrupting the function of said first means when drawing processing is ended, with control of drawing processing started by scanning the position of image information.

10. A system according to claim 9, further comprising internal and external synchronizing circuits, and means for independently operating said internal and external synchronizing circuits.

11. A system according to claim 9, further comprising:
    means for automatically generating a scan line control signal of a matrix electrode and an image information transfer control signal by a combination of programmable parameters; and
    means for operating the control signals independently of each other.

12. A system according to claim 9, wherein counting of scanning times of matrix electrode scan lines in the drawing processing is controlled by a sync signal of a device, with control of the drawing process started by scanning the position of image information, and the counting is synchronized with an operation of means for automatically generating a matrix electrode scan line control signal and an image information transfer control signal by a combination of programmable parameters.

13. A system according to claim 9, further comprising a third memory unit for storing the number of lines detected upon access to said image information storage memory before the interruption of said first means in accordance with contents of said second memory unit and the drawing processing, control of which is started by scanning the position of the image information.

14. A system according to claim 13, further comprising comparing means for comparing contents of said third memory unit with the number of lines detected upon access to said image information storage memory until the interruption of said first means in accordance with contents of said third memory unit, the contents of said second memory unit upon interruption of the function of said first means, and the drawing processing, with control of the drawing processing started by scanning a position of the image information.

15. A system according to claim 14, wherein after partial rewriting corresponding to the contents of said first memory unit is executed in accordance with the comparison result of said comparing means, a. the number of lines detected upon access to said image information storage memory until the interruption of said first means is stored in said third memory unit in accordance with the contents of said second memory unit and the drawing processing, control of which is started by scanning the position of image information on a display device, and the drawing processing is ended, with control of the drawing processing started by scanning the position of image information on a display device, or b. access from the drawing processing to said image information storage memory is inhibited, counting of scanning times of scan lines of a device is interrupted, and partial rewriting corresponding to the contents of said third memory is executed, or c. presence/absence of overlapping of access data in the scanning direction is detected in accordance with the number lines detected upon access to said image information storage memory until the interruption of said first means in accordance with the contents of said second memory unit upon interruption of the function of said first means and the drawing processing, control of which is started by scanning the position of image information on a display device, and the contents of said third memory unit, calculation of a partial write area corresponding to the detection result is performed, and partial writing is executed while the counting of scanning times of scan lines on said device is interrupted, or d. the number of lines detected upon access to said image information storage memory until the interruption of said first means in accordance with the contents of said second memory unit and the drawing processing, control of which is started by scanning a position of image information on said display device is stored in said third memory, the interruption of counting of scanning times of scan lines on said device is released, and the drawing processing is ended, with control of the drawing processing started by scanning the position of image information on said display device.

16. An apparatus according to claim 9, wherein said system has a function of, when line addresses are stored in said second memory unit, comparing sizes of the addresses in an order of access, and selecting a line address to be stored in accordance with the comparison results of said second means.

17. A system according to claim 9, further comprising a comparing unit for, when an initial line address detected and stored is stored in said second memory unit, comparing two-dimensional coordinates detected and stored for the first time with an area accessed until the drawing processing is ended, with control of the drawing processing started by scanning the position of image information on said display device, and comparing two-dimensional coordinates detected and stored previously with an area accessed until the drawing processing is ended.

18. A system according to claim 17, further comprising a fourth memory controlled in accordance with the comparison result of said comparing unit, wherein image information to a VRAM corresponding to the position of image information on said display device is controlled in accordance with a state of said fourth memory.

* * * * *

UNITED STATES PATENT AND TRADEMARK OFFICE
CERTIFICATE OF CORRECTION

PATENT NO. : 5,751,277

DATED : May 12, 1998

INVENTOR(S): Inoue

It is certified that error appears in the above-identified patent and that said Letters Patent is hereby corrected as shown below:

On the title page, item [57] in the Abstract:

Line 7, "storage with," should read --storage memory, with--.

COLUMN 5:

Line 15, "crystal," should read --crystal device (FLCD),--.
Line 16, "device" should be deleted.
Line 17, "(FLCD)" should be deleted.
Line 37, "upper" should read --higher--.

COLUMN 6:

Line 62, "to" should be deleted.

COLUMN 16:

Line 21, "results" should read --result--.

Signed and Sealed this

Sixteenth Day of February, 1999

Attest:

*Acting Commissioner of Patents and Trademarks*

*Attesting Officer*